United States Patent Office 3,031,502
Patented Apr. 24, 1962

---

3,031,502
METHOD FOR MAKING ARYLBORAZOLES
Harry Goldsmith, Long Beach, Calif., assignor to United States Borax & Chemical Corporation, Los Angeles, Calif., a corporation of Nevada
No Drawing. Filed May 27, 1959, Ser. No. 816,037
2 Claims. (Cl. 260—551)

The present invention relates as indicated to an improved method for making arylborazoles.

The class of materials known as borazoles are heterocyclic hexatomic ring compounds having the general formula $(HB-NH)_3$ and any substituents of the ring are named with "B" or "N" prefixes to designate their positions. The present invention is concerned with a method for producing those borazoles where the "B" and/or the "N" are substituted with aryl radicals.

It is well known to those skilled in the art that borazoles having aryl substituents are readily prepared by reaction of B-haloborazoles with Grignard reagents as shown by the following general reactions:

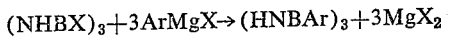

or

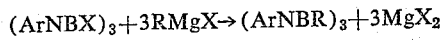

or

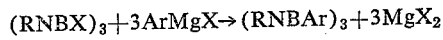

or

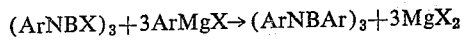

where R is an alkyl radical, Ar is an aryl radical and X is a halogen.

The foregoing equations illustrate reactions, which at first blush, appear to proceed easily and from a study of such reactions it would appear that it is a simple matter to separate the desired borazole from the magnesium halide, which is the other product of the reaction. However, those skilled in the art have found that the above illustrated reactions actually result in a reaction mass wherein the magnesium halide complexes with the desired borazole and the reaction mass is extremely difficult to separate even using special techniques.

The exact complex which forms between the desired borazole and the magnesium halide has not been completely identified; however, by following the teachings of the present invention yields of 70–80% are obtained.

It is immaterial which of the Grignard reagents are reacted with the B-haloborazole; the reaction always results in a complex which must be broken in order to obtain the arylborazole.

It is therefore the principal object of this invention to provide an improved method for producing arylborazoles.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises a method for producing arylborazoles which comprises reacting, in an organic solvent, a B-haloborazole selected from the group consisting of $(HNBX)_3$, $(RNBX)_3$ and $(R'NBX)_3$ with a Grignard reagent, distilling said solvent from the reaction mass, adding water to said ansolvous mass, and separating the resultant arylborazole from the aqueous solution; wherein R is an alkyl radical, R' is an aryl radical and X is a halogen, and when said B-haloborazole is $(HNBX)_3$ and $(RNBX)_3$ then said Grignard reagent must contain an aryl radical.

From the foregoing broadly stated paragraph, it will be seen that the crux of the present invention is that the borazole-magnesium halide complex can be broken by removing the solvent from the reaction mass and then adding water to the ansolvous mass. As a result of this treatment the complex is broken, the magnesium halide goes into solution in the water and the borazole remains as a solid mass which can then be obtained by simple filtration or other separation means. The borazole thus obtained can then be readily purified by any of the well-known techniques such as recrystallization from a solvent, sublimation, distillation, fractionation, etc.

The improvement which comprises the crux of the present invention is applicable to any arylborazole which is the result of a reaction between any Grignard reagent and any B-haloborazole. As for the Grignard reagent used in the reaction, those skilled in the art know that Grignard reagents can either be alkyl magnesium halides or aryl magnesium halides, and it only being important to the present invention that when a B-haloborazole such as $(HN-BX_3)$ or $(RN-BX)_3$ is used as one of the ingredients of the reaction then the Grignard reagent used must be of the aryl magnesium halide type.

So that the present invention can be more clearly understood, the following examples are given:

I

A solution of 200 ml. of 3 M phenylmagnesium bromide in ether was added with stirring to a solution of 36.8 g. of B-trichloroborazole in 200 ml. of ether over a 15-minute period. The reaction mixture was heated under reflux for about 1 hour and a small amount of precipitate formed which filtered off. The ether was distilled from the filtrate to give a yellow semi-solid residue which was then extracted with and crystallized from cyclohexane.

This process resulted in a 22% yield of B-triphenylborazole.

II

A solution of 200 ml. of 3 M phenylmagnesium bromide in ether was added with stirring to a solution of 36.8 g. of B-trichloroborazole in 200 ml. of ether over a 15-minute period. The solvent was removed by distillation and the residue dried at water aspirator pressure. The substantially ansolvous mass was then treated with 500 ml. of water. The mixture was stirred well and then filtered. The colorless solid retained on the filter paper was then extracted with and recrystallized from cyclohexane.

This process resulted in a 76% yield of B-triphenylborazole.

It is also of importance to note that the product obtained from the second example had a melting point of about 179–182° C. and the product obtained from the first example had a melting point of 169–174° C. The melting point of substantially pure B-triphenylborazole has been shown to be about 180–182° C. Thus the present process not only increases the yields of the borazoles more than threefold, but also produces a substantially purer product.

Other modes of applying the principle of the invention may be employed, change being made as regards the details described, provided the features stated in any of the following claims or the equivalent of such be employed.

I, therefore, particularly point out and distinctly claim as my invention:

1. In the method for producing arylborazoles which comprises refluxing, in an organic solvent, a B-haloborazole selected from the group consisting of $(HNBX)_3$, $(RNBX)_3$ and $(R'NBX)_3$ where R is an alkyl radical, R' is an aryl radical and X is halogen with a Grignard reagent, and wherein at least one of said reactants contains an aryl group in its molecule, the improvement which comprises distilling the solvent from the reaction mass, adding water to the ansolvous mass and separating the resultant arylborazole from the aqueous solution.

2. In the method of producing B-triphenylborazole which comprises refluxing B-trichloroborazole and phenylmagnesium bromide in ether, the improvement which comprises distilling the ether from the reaction mass, adding water to the ansolvous mass and separating the B-triphenylborazole from the aqueous solution.

References Cited in the file of this patent
UNITED STATES PATENTS

| | | |
|---|---|---|
| 2,821,463 | Scott et al. | Jan. 28, 1958 |
| 2,954,402 | Stafiej et al. | Sept. 27, 1960 |

OTHER REFERENCES

Groszos et al.: Journal of the American Chemical Society, vol. 80, pages 1358–1360 (1958).

UNITED STATES PATENT OFFICE
CERTIFICATE OF CORRECTION

Patent No. 3,031,502  April 24, 1962

Harry Goldsmith

It is hereby certified that error appears in the above numbered patent requiring correction and that the said Letters Patent should read as corrected below.

Column 2, line 36, for "crystallized" read -- recrystallized --.

Signed and sealed this 11th day of September 1962.

(SEAL)
Attest:

ERNEST W. SWIDER
Attesting Officer

DAVID L. LADD
Commissioner of Patents